United States Patent
Chang

(10) Patent No.: US 8,396,207 B2
(45) Date of Patent: Mar. 12, 2013

(54) SLIDING MECHANISM

(75) Inventor: A-Ming Chang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 112 days.

(21) Appl. No.: 13/163,119

(22) Filed: Jun. 17, 2011

(65) Prior Publication Data

US 2012/0291224 A1    Nov. 22, 2012

(30) Foreign Application Priority Data

May 20, 2011    (TW) .............................. 100117704 A

(51) Int. Cl.
*H04M 1/00*    (2006.01)
*H04M 9/00*    (2006.01)

(52) U.S. Cl. ................................. 379/433.12; 455/575.4

(58) Field of Classification Search ............. 379/433.11, 379/433.12; 455/575.4; 361/679.39, 679.27, 361/679.13, 679.56; 16/302, 364
See application file for complete search history.

(56) References Cited

U.S. PATENT DOCUMENTS

| | | | |
|---|---|---|---|
| 2007/0060220 A1* | 3/2007 | Hsu ............................ | 455/575.4 |
| 2008/0261659 A1* | 10/2008 | Jang et al. ...................... | 455/566 |
| 2009/0264168 A1* | 10/2009 | Wang et al. ................ | 455/575.4 |
| 2010/0144409 A1* | 6/2010 | Huang et al. ................ | 455/575.4 |

* cited by examiner

*Primary Examiner* — Tuan D Nguyen
(74) *Attorney, Agent, or Firm* — Kirton McConkie; Evan R. Witt

(57) ABSTRACT

The present invention discloses a sliding mechanism including a first board, a second board, a first fixed piece, a frame, a first elastic element and a first sliding element. The second board includes a first slot. The first fixed piece passes through the first slot to be disposed on the first board. The first elastic element is disposed in the frame. When the second board slides a first distance relative to the first board, the first sliding element slides along a first direction to press the first elastic element, so as to make the first elastic element generate a first elastic force. When the second board slides a second distance relative to the first board, the first sliding element slides along a second direction and makes the first elastic element release the first elastic force. It makes the second board slide automatically relative to the first board.

25 Claims, 9 Drawing Sheets

US 8,396,207 B2

SLIDING MECHANISM

FIELD OF THE INVENTION

The present invention generally relates to a sliding mechanism, and more particularly to a sliding mechanism for information products capable of sliding automatically.

BACKGROUND OF THE INVENTION

With the increase in use of personal mobile devices in recent years, the sliding mechanisms of the personal mobile devices are diverse and mature. A sliding mechanism for a personal mobile device is illustrated in the Taiwanese Utility Model Patent Number M390622. FIG. 1 illustrates a schematic view of a sliding mechanism according to the Taiwanese Utility Model Patent Number M390622. Referring to FIG. 1, the sliding mechanism 10 comprises a main plate 20, two elastic modules 30 and a sliding plate 40. The main plate 20 comprises a main board portion 21, two guiding slots 22, two liners 23 and a guider 24, and the sliding plate 40 comprises a sliding board portion 41, two guiding rails 42, two sliding through slots 43 and two positioning apertures 44.

Referring to FIG. 1 also, the guiding slots 22 of the main plate 20 are located at two sides of the main plate 20, formed as C shaped structures by folding side edges of the main plate 20, and capable of assembling with the liners 23 and the guiding rails 42 of the sliding plate 40. Therefore, the sliding plate 40 is capable of sliding stably relative to and not likely to be separated from the main plate 20. In addition, the elastic modules 30 are disposed in the sliding through slots 43 of the sliding plate 40, wherein one end of the elastic modules 30 are fixed to the positioning apertures 44, and the other end of the elastic modules 30 lean against guiding portions 242 of the guider 24.

FIG. 2 illustrates an operating schematic view of the sliding mechanism according to the Taiwanese Utility Model Patent Number M390622. Referring to FIG. 2, when the sliding plate portion 41 slides a predetermined distance relative to the main plate portion 21, elastic forces generated by the elastic modules 30 are increased to maximum due to the presses provided by the guiding portions 242. Therefore, when the sliding plate portion 41 slides over the predetermined distance relative to the main plate portion 21, the elastic forces generated by the elastic modules 30 are decreased due to deformation of the guider 24 decreases the presses provided by the guiding portions 242. Accordingly, the elastic forces generated by the elastic modules 30 are released, so as to make the sliding plate portion 41 slide automatically relative to the main plate portion 21.

However, the traditional sliding mechanisms are only suitable for the small sliding mechanisms due to the design thereof are usually restricted to shorter sliding distance. In addition, the guiding slots 22 and the guiding rails 42 designed for limiting sliding routes of the main plate 20 and the sliding plate 40 complicate structures of the main plate 20 and the sliding plate 40, and the liners 23 must be disposed in the guiding slots 22 to make the sliding plate 40 slide smoothly relative to the main plate 20. Therefore, manufacturing and assembling costs of the sliding mechanism 10 are significantly increased.

SUMMARY OF THE INVENTION

The present invention is directed to a sliding mechanism with simple structure and lower cost.

In a preferred embodiment, the present invention provides a sliding mechanism comprising:
a first board;
a second board, disposed over the first board and has a first slot;
a first fixed piece, disposed on the first board, wherein the first fixing piece passes through the first slot of the second board;
a frame, disposed over the second board;
a first elastic element, disposed in the frame; and
a first sliding element, disposed over the second board, wherein one end of the first sliding element is fixed to the first fixed piece, when the second board slides a first distance relative to the first board, the first sliding element slides along a first direction to press the first elastic element, so as to make the first elastic element generate a first elastic force, while when the second board slides a second distance relative to the first board, the first sliding element slides along a second direction to make the first elastic element release the first elastic force, so as to make the second board slide automatically relative to the first board.

In a preferred embodiment, the first slot is a linear slot.

In a preferred embodiment, the first elastic element is a compression spring.

In a preferred embodiment, the first sliding element comprises a first push bar and a first linkage, wherein the first push bar is disposed in the frame, an end of the first linkage is fixed to the first fixed piece, and the other end of the first linkage is pivoted to the first push bar.

In a preferred embodiment, the first push bar comprises a protruding portion capable of making the first elastic element generate deformation.

In a preferred embodiment, the protruding portion is a plate.

In a preferred embodiment, the first push bar passes through the first elastic element.

In a preferred embodiment, the frame comprises two openings, and the first push bar passes through the two openings.

In a preferred embodiment, the sliding mechanism further comprises a first connecting element, the first fixed piece has a first fixing aperture, and the first linkage has a second fixing aperture, wherein the first connecting element passes through the first fixing aperture and the second fixing aperture, so as to connect the first fixed piece and the first linkage.

In a preferred embodiment, the sliding mechanism further comprises a first pivoting element, the first linkage has a first pivoting aperture, and the first push bar has a second pivoting aperture, wherein the first pivoting element passes through the first pivoting aperture and the second pivoting aperture, so as to connect the first linkage and the first push bar.

In a preferred embodiment, the first distance is smaller than the second distance.

In a preferred embodiment, the second board further comprises a groove disposed on a moving route of the first push bar, and the groove has a plurality of teeth therein, so as to provide a plurality of steps during the second board slides.

In a preferred embodiment, the sliding mechanism further comprises:
a second slot, disposed to the second board;
a second fixed piece, disposed on the first board, wherein the second fixed piece passes through the second slot of the second board;
a second elastic element, disposed in the frame; and
a second sliding element, disposed over the second board, wherein an end of the second sliding element is fixed to the second fixed piece, when the second board slides the first distance relative to the first board, the second sliding element slides along the second direction to press the second elastic element, so as to make the second elastic element generate a second elastic force, while when the second board slides the second distance relative to the first board, the second sliding element slides along the first direction to make the second elastic element release the second elastic force, so as to make the second board slide automatically relative to the first board.

In a preferred embodiment, the first slot and the second slot are linear slots.

In a preferred embodiment, the first elastic element and the second elastic element are compression springs.

In a preferred embodiment, the first sliding element comprises a first push bar and a first linkage, the second sliding element comprises a second push bar and a second linkage, and the frame comprises a first containing space and a second containing space, wherein the first push bar is disposed in the first containing space, an end of the first linkage is fixed to the first fixed piece, the other end of the first linkage is pivoted to the first push bar, the second push bar is disposed in the second containing space, an end of the second linkage is fixed to the second fixed piece, and the other end of the second linkage is pivoted to the second push bar.

In a preferred embodiment, the first push bar comprises a first protruding portion capable of making the first elastic element generate deformation, and the second push bar comprises a second protruding portion capable of making the second elastic element generate deformation.

In a preferred embodiment, the first protruding portion and the second protruding portion are plates.

In a preferred embodiment, the first push bar passes through the first elastic element, and the second push bar passes through the second elastic element.

In a preferred embodiment, the frame comprises a first opening set and a second opening set, wherein the first push bar passes through the first opening set, and the second push bar passes through the second opening set.

In a preferred embodiment, each of the first opening set and the second opening set comprises two openings.

In a preferred embodiment, the sliding mechanism further comprises a first connecting element and a second connecting element, the first fixed piece has a first fixing aperture, the first linkage has a second fixing aperture, the second fixed piece has a third fixing aperture, and the second linkage has a fourth fixing aperture, wherein the first connecting element passes through the first fixing aperture and the second fixing aperture, so as to connect the first fixed piece and the first linkage, and the second connecting element passes through the third fixing aperture and the fourth fixing aperture, so as to connect the second fixed piece and the second linkage.

In a preferred embodiment, the sliding mechanism further comprises a first pivoting element and a second pivoting element, the first linkage has a first pivoting aperture, the first push bar has a second pivoting aperture, the second linkage has a third pivoting aperture, and the second push bar has a fourth pivoting aperture, wherein the first pivoting element passes through the first pivoting aperture and the second pivoting aperture, so as to connect the first linkage and the first push bar, and the second pivoting element passes through the third pivoting aperture and the fourth pivoting aperture, so as to connect the second linkage and the second push bar.

In a preferred embodiment, the first distance is smaller than the second distance.

In a preferred embodiment, the second board further comprises a first groove and a second groove, wherein the first groove is disposed on a moving route of the first push bar, the second groove is disposed on a moving route of the second push bar, and each of the first groove and the second groove has a plurality of teeth therein, so as to provide a plurality of steps during the second board slides.

DETAILED DESCRIPTION OF THE PREFERRED EMBODIMENT

Figure 1:
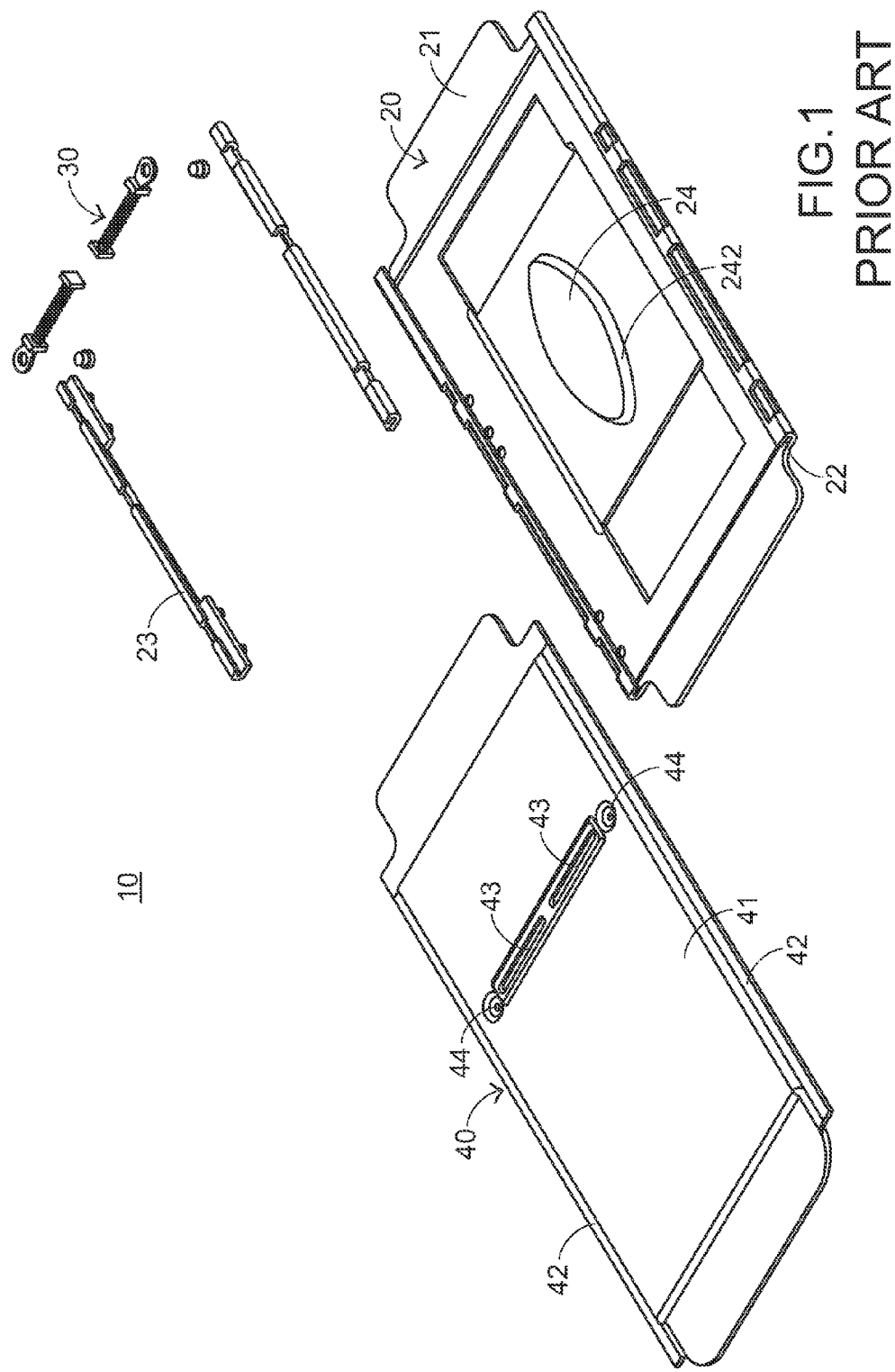
FIG. 1 illustrates a schematic view of a sliding mechanism according to the Taiwanese Utility Model Patent Number M390622.
Figure 2:
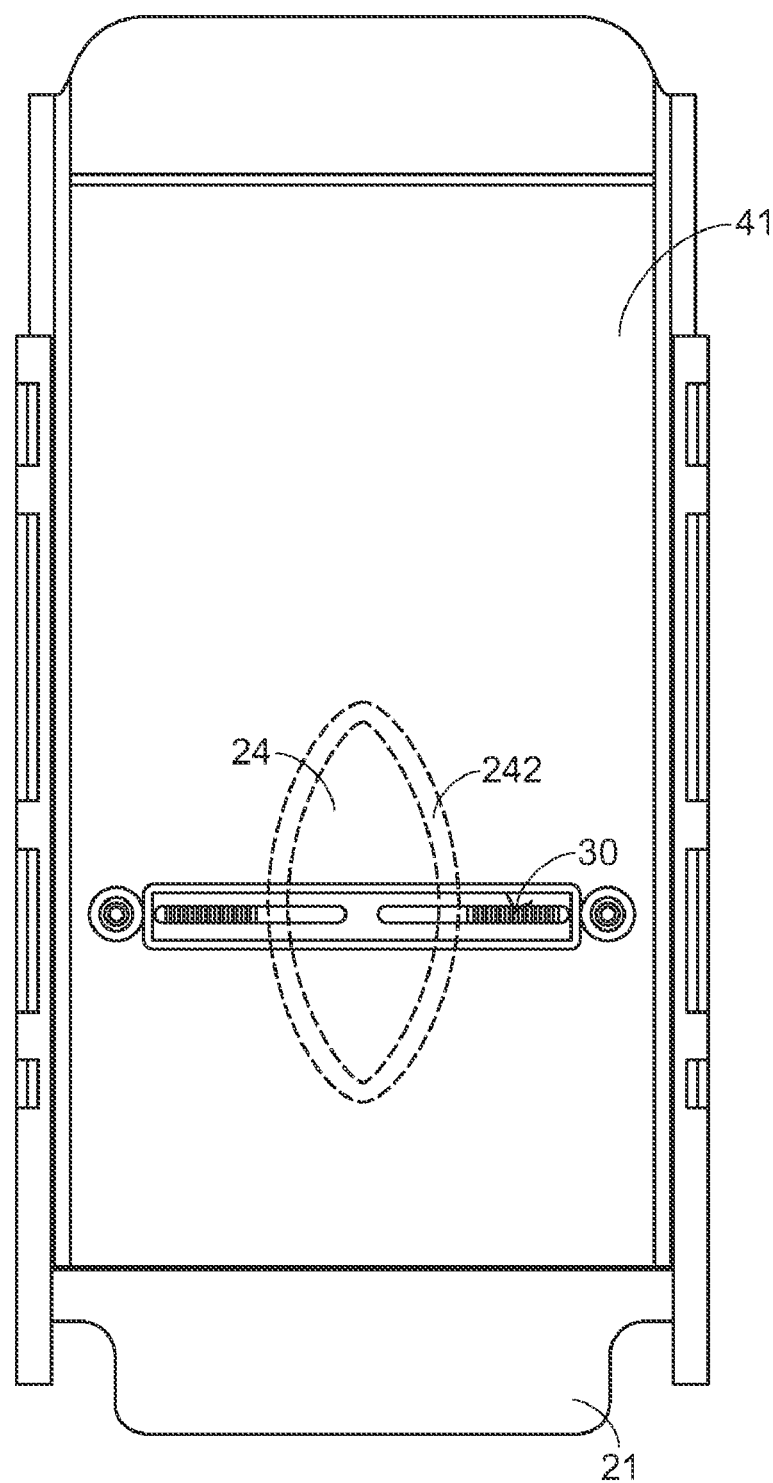
FIG. 2 illustrates an operating schematic view of the sliding mechanism according to the Taiwanese Utility Model Patent Number M390622.
Figure 3:
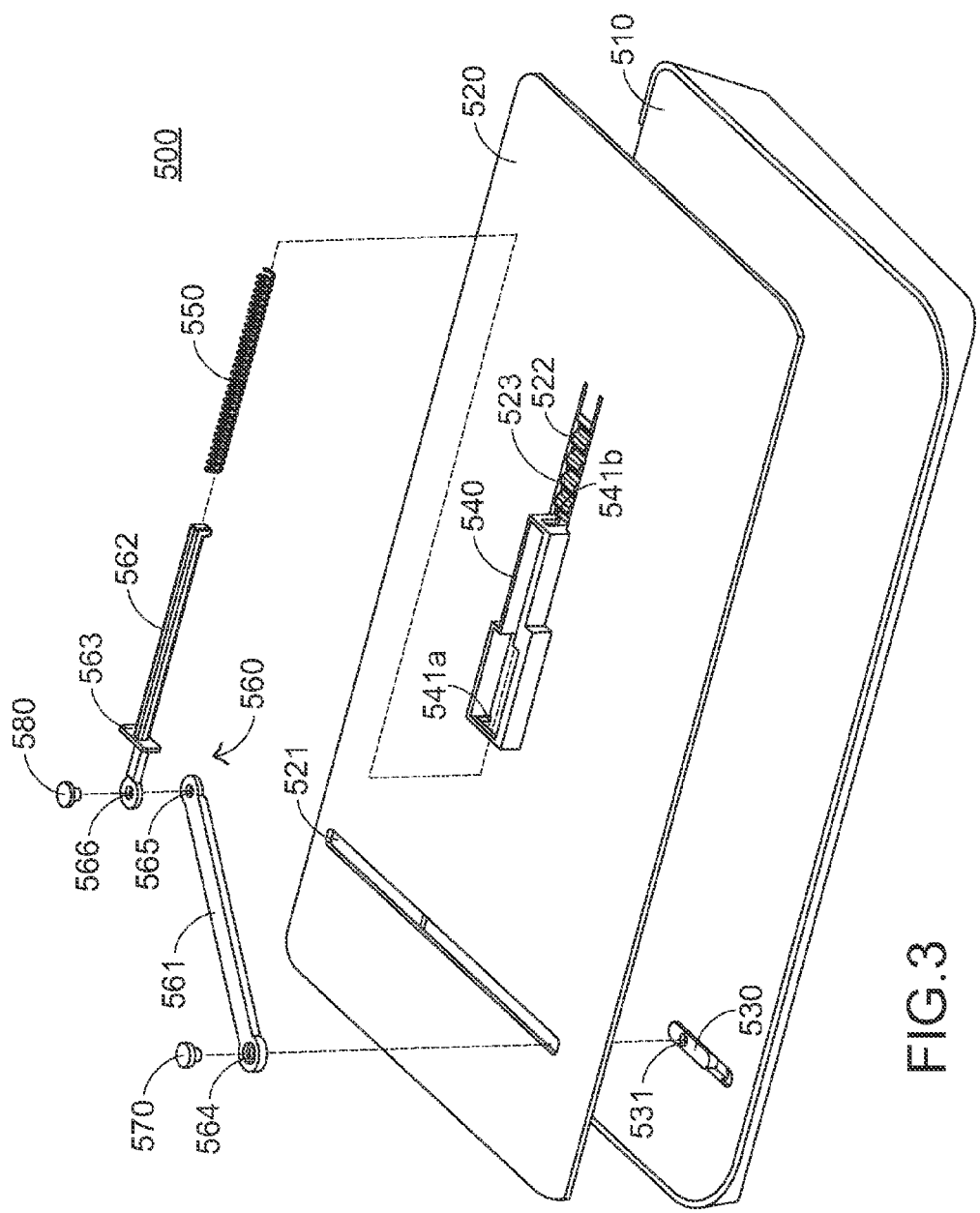
FIG. 3 illustrates an explosion view of a sliding mechanism according to a first embodiment of the present invention.

FIG. 3 illustrates an explosion view of a sliding mechanism according to a first embodiment of the present invention. Referring to FIG. 3, the sliding mechanism 500 comprises a first board 510, a second board 520, a first fixed piece 530, a frame 540, a first elastic element 550, a first sliding element 560, a first connecting element 570, and a first pivoting element 580. The fixed piece 530 has a first fixing aperture 531, the frame 540 has two openings 541a and 541b, and the first sliding element 560 comprises a first linkage 561 and a first push bar 562.

Figure 4:
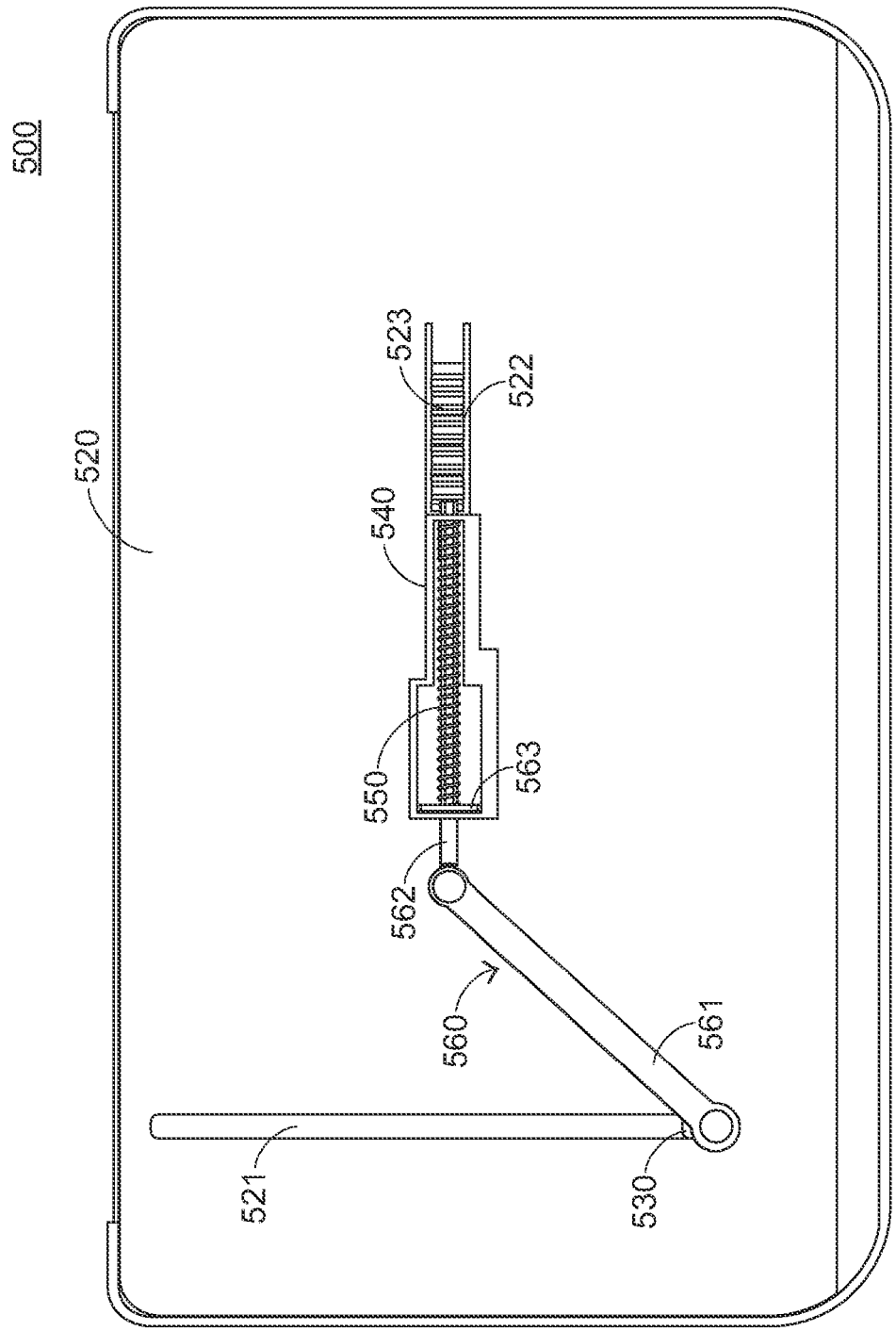
FIG. 4 illustrates a combination schematic view of the sliding mechanism according to the first embodiment of the present invention.

Relative positions among all elements are illustrated hereinafter. FIG. 4 illustrates a combination schematic view of the sliding mechanism according to the first embodiment of the present invention. As illustrated in FIG. 3 and FIG. 4, the second board 520 is disposed over the first board 510, has a first slot 521, and is capable of sliding relative to the first board 510. In the present preferred embodiment, the first slot 521 is a linear slot. The first fixed piece 530 is disposed on the first board 510 and passes through the first slot 521 of the second board 520, so as to connect the first board 510 and the linkage 561 of the first sliding element 560. The frame 540 and the first sliding element 560 are disposed over the second board 520, and the first elastic element 550 is disposed in the frame 540. In addition, the first push bar 562 of the first sliding element 560 passes through the two openings 541a and 541b of the frame 540, passes through the first elastic element 550, and is disposed in the frame 540.

An assembling process of the first sliding element 560 is illustrated herein after. Referring to FIG. 3 also, the first linkage 561 has a second fixing aperture 564 and a first pivoting aperture 565, and the first push bar 562 has a protruding portion 563 and a second pivoting aperture 566. The first connecting element 570 passes through the first fixing aperture 531 of the first fixed piece 530 and the second fixing aperture 564 of the first linkage 561, so as to connect the first fixed piece 530 and the first linkage 561. Further, the first pivoting element 580 passes through the first pivoting aperture 565 of the first linkage 561 and the second pivoting aperture 566 of the first push bar 562, so as to connect the first linkage 561 and the first push bar 562.

Figure 5:
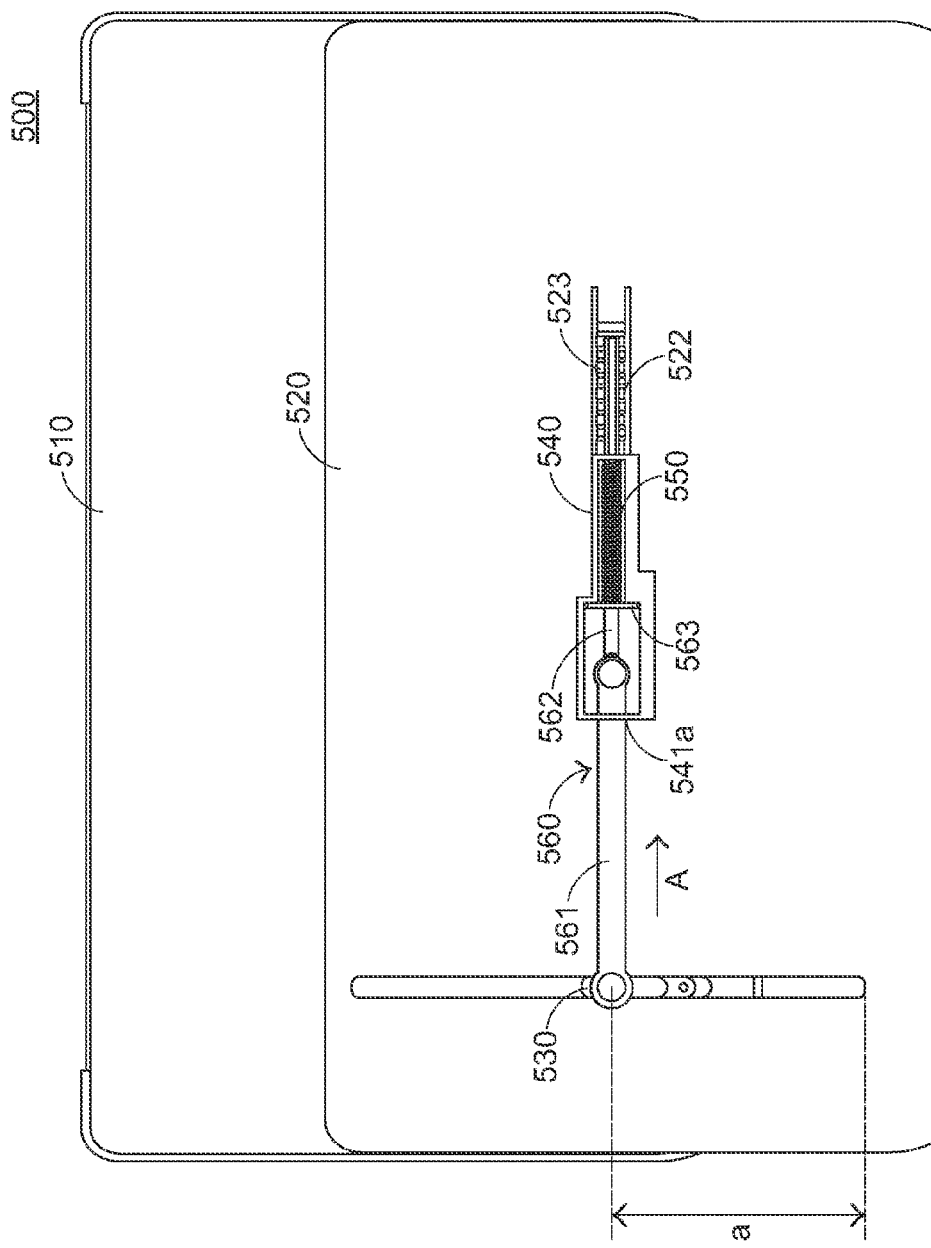
FIG. 5 illustrates a schematic view of the sliding mechanism operated with a first movement according to the first embodiment of the present invention.

FIG. 5 illustrates a schematic view of the sliding mechanism operated with a first movement according to the first embodiment of the present invention. Referring to FIG. 5, when the second board 520 slides a first distance a relative to the first board 510 as illustrated in FIG. 5, the frame 540 moves together with the second board 520, and thus a distance between the frame 540 and the first fixed piece 530 is reduced. Therefore, the first linkage 561 of the sliding element 560 passes through the opening 541a of the frame 540 to drive the first push bar 562 to move along a first direction A, and thus the first elastic element 550 passed through by the first push bar 562 is deformed due to being pressed by the protruding portion 563 of the first push bar 562, so as to make the first elastic element 550 generate an elastic force. In the present preferred embodiment, the first elastic element 550 is a compression spring, and the protruding portion 563 of the first push bar 562 is a plate capable of being forced averagely by the elastic element 550.

Figure 6:
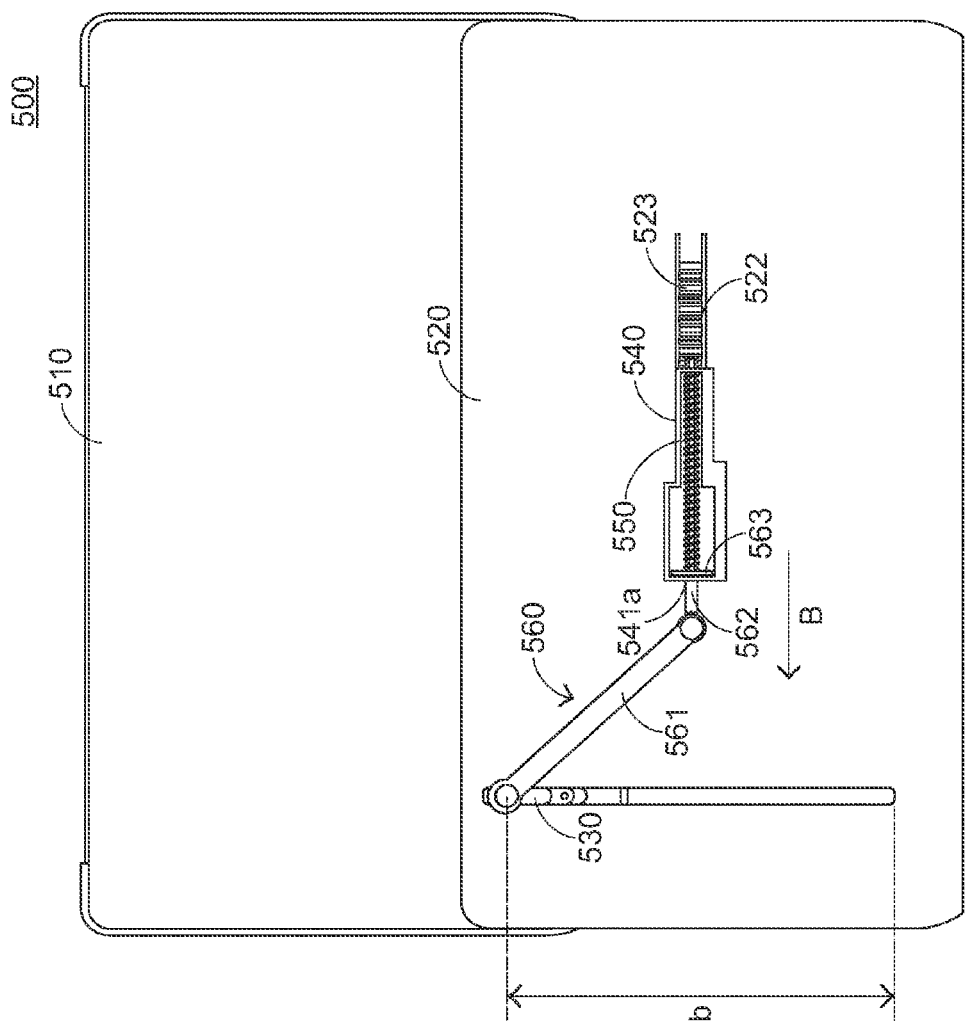
FIG. 6 illustrates a schematic view of the sliding mechanism operated with a second movement according to the first embodiment of the present invention.

FIG. 6 illustrates a schematic view of the sliding mechanism operated with a second movement according to the first embodiment of the present invention. Referring to FIG. 6, when the second board 520 slides a second distance b relative to the first board 510 as illustrated in FIG. 6, the frame 540 moves together with the second board 520, and thus a distance between the frame 540 and the first fixed piece 530 is increased. Hence, the first linkage 561 of the sliding element 560 passes through out of the opening 541a of the frame 540 to drive the first push bar 562 to move along a second direction B, and thus the first elastic element 550 passed through by the first push bar 562 is not pressed by the protruding portion 563 of the first push bar 562 anymore, so as to make the second board 520 slide automatically relative to the first board 510 due to the first elastic element 550 release the elastic force.

In the present preferred embodiment, the first distance a is smaller than the second distance b. In addition, as illustrated in FIG. 3, FIG. 4, FIG. 5 and FIG. 6, the second board 520 further comprises a groove 522, wherein the groove 522 is disposed on a moving route of the first push bar 562, and the groove 522 has a plurality of teeth 523 therein. When the second board 520 slides relative to the first board 510, the first push bar 562 moves along the first direction A or the second direction B, and generates a friction with the plurality of teeth 523 in the groove 522, so as to provide a plurality of steps during the second board 520 slides. Accordingly, it is able to enrich hand feelings during users operate the sliding mechanism 500.

Figure 7:
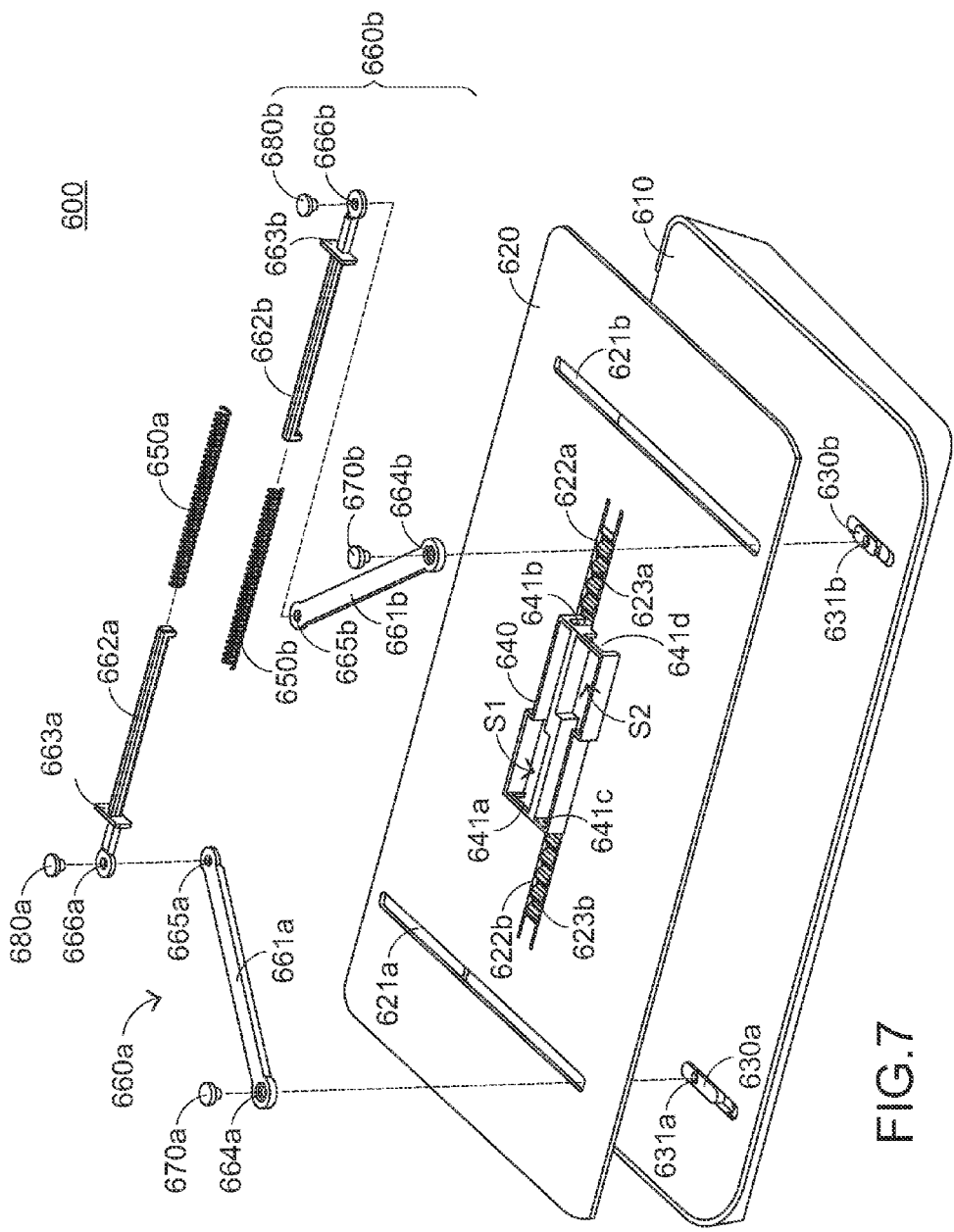
FIG. 7 illustrates an explosion view of the sliding mechanism according to a second embodiment of the present invention.

A sliding mechanism according to a second embodiment of the present invention is illustrated herein after. FIG. 7 illustrates an explosion view of the sliding mechanism according to a second embodiment of the present invention. Referring to FIG. 7, the sliding mechanism 600 comprises a first board 610, a second board 620, a first fixed piece 630a, a second fixed piece 630b, a frame 640, a first elastic element 650a, a second elastic element 650b, a first sliding element 660a, a second sliding element 660b, a first connecting element 670a, a second connecting element 670b, a first pivoting element 680a, and a second pivoting element 680b.

In detail, the second board 620 has a first slot 621a and a second slot 621b. In the present preferred embodiment, the first slot 621a and the second slot 621b are linear slots. The fixed piece 630a has a first fixing aperture 631a, and the second fixed piece 630b has a third fixing aperture 63 lb. In addition, the frame 640 disposed over the second board 620 has a first opening set 641a, 641b and a second opening set 641c, 641d, the first sliding element 660a comprises a first linkage 661a and a first push bar 662a, and the second sliding element 660b comprises a second linkage 661b and a second push bar 662b. Herein, the first linkage 661a has a second fixing aperture 664a and a first pivoting aperture 665a, and the first push bar 662a has a second pivoting aperture 666a and a first protruding portion 663a, while the second linkage 661b has a fourth fixing aperture 664b and a third pivoting aperture 665b, and the second push bar 662b has a fourth pivoting aperture 666b and a second protruding portion 663b.

The assembling processes of all elements of the second embodiment of the present invention are substantially similar to that illustrated with FIG. 3, besides the sliding mechanism 600 further comprises the second fixed piece 630b, the second elastic element 650b, the second sliding element 660b, the second connecting element 670b and the second pivoting element 680b for enhancing the sliding stability of the sliding mechanism 600. In addition, the frame 640 further comprises a first containing space S1 and a second containing space S2 for containing the above mentioned additional elements.

Relative positions among all elements are illustrated herein after. As illustrated in FIG. 7, the second board 620 is disposed over the first board 610 and capable of sliding relative to the first board 610. The first fixed piece 630a and the second fixed piece 630b are disposed on the first board 610, wherein the first fixed piece 630a passes through the first slot 621a of the second board 620a, and the second fixed piece 630b passes through the second slot 621b of the second board 620b.

The first sliding element 660a and the second sliding element 660b are disposed over the second board 620. The first elastic element 650a is disposed in the first containing space Si of the frame 640, and the second elastic element 650b is disposed in the second containing space S2 of the frame 640. In addition, the first push bar 662a of the first sliding element 660a passes through the first opening set 641a and 641b of the frame 640, passes through the first elastic element 650a, and is disposed in the first containing space Si of the frame 640, while the second push bar 662b of the second sliding element 660b passes through the second opening set 641c and 641d of the frame 640, passes through the second elastic element 650b, and is disposed in the second containing space S2 of the frame 640.

Assembling processes of the first sliding element 660a and the second sliding element 660b are illustrated herein after, and the first sliding element 660a is illustrated first. Referring to FIG. 7 also, the first connecting element 670a passes through the first fixing aperture 631a of the first fixed piece 630a and the second fixing aperture 664a of the first linkage 661a, so as to connect the first fixed piece 630a and the first linkage 661a. In addition, the first pivoting element 680a passes through the first pivoting aperture 665a of the first linkage 661a and the second pivoting aperture 666a of the first push bar 662a, so as to connect the first linkage 661a and the first push bar 662a.

The assembling process of the second sliding element 660b is similar to that of the first sliding element 660a illustrated above. As illustrated in FIG. 7, the second connecting element 670b passes through the third fixing aperture 63 lb of the second fixed piece 630b and the fourth fixing aperture 664b of the second linkage 661b, so as to connect the second fixed piece 630b and the second linkage 661b. In addition, the second pivoting element 680b passes through the third pivoting aperture 665b of the second linkage 661a and the fourth pivoting aperture 666b of the second push bar 662b, so as to connect the second linkage 661b and the second push bar 662b.

Figure 8:
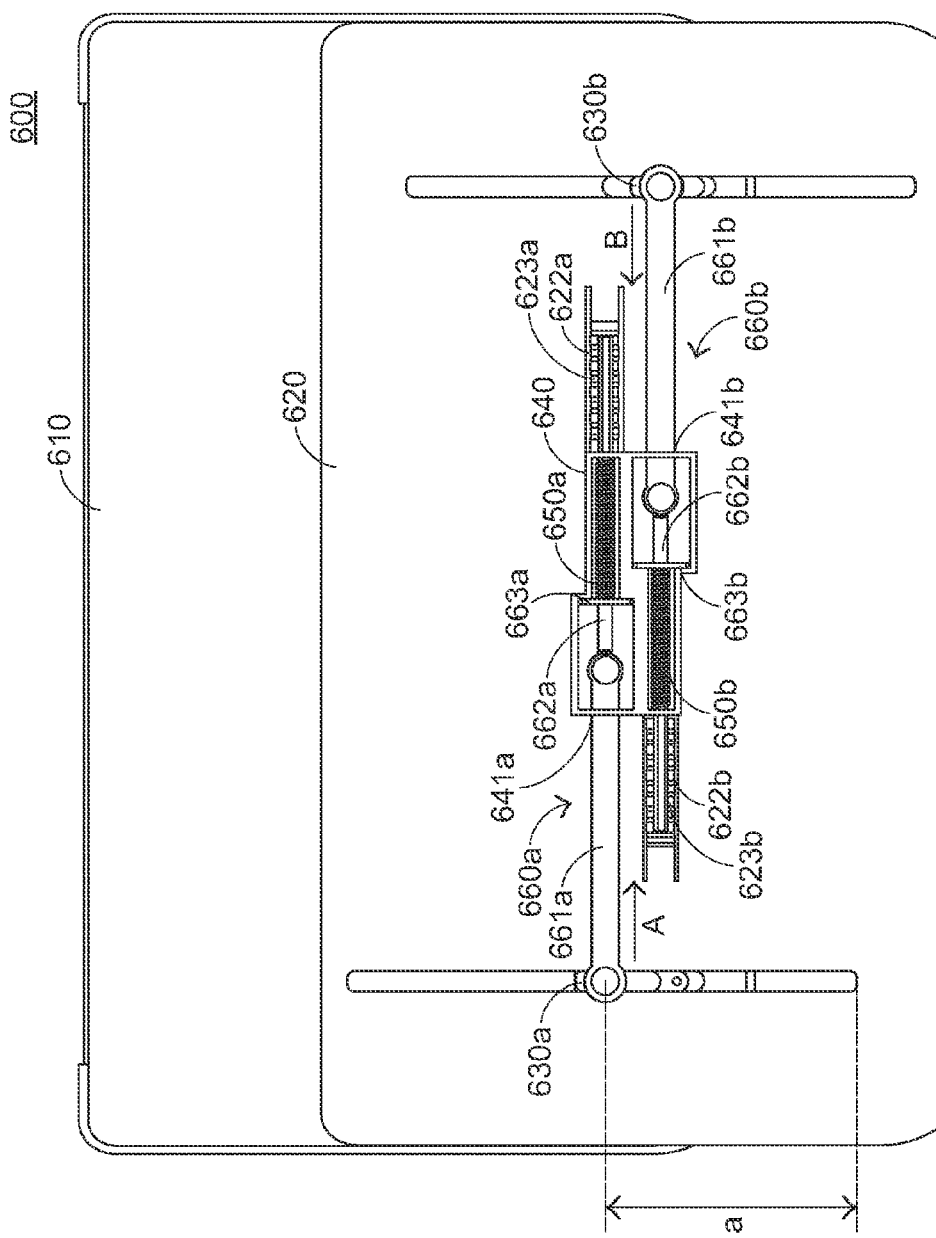
FIG. 8 illustrates a schematic view of the sliding mechanism operated with a first movement according to the second embodiment of the present invention.

FIG. 8 illustrates a schematic view of the sliding mechanism operated with a first movement according to the second embodiment of the present invention. Referring to FIG. 8 herein after, when the second board 620 slides a first distance a relative to the first board 610 as illustrated in FIG. 8, the frame 640 moves together with the second board 620, and thus a distance between the frame 640 and the first fixed piece 630a and a distance between the frame 640 and the second fixed piece 630b are reduced. Therefore, the first linkage 661a of the first sliding element 660a passes through the opening 641a of the first opening set of the frame 640 to drive the first push bar 662a to move along the first direction A. At the same time, the second linkage 661b of the second sliding element 660b passes through the opening 641d of the second opening set of the frame 640 to drive the second push bar 662b to move along the second direction B. Hence, the first elastic element 650a passed through by the first push bar 662a and the second elastic element 650b passed through by the second push bar 662b are deformed due to being pressed respectively by the first protruding portion 663a of the first push bar 662a and the second protruding portion 663b of the second push bar 662b, so as to make the first elastic element 650a and the second elastic element 650b generate elastic forces. In the present preferred embodiment, each of the first elastic element 650a and the second elastic element 650b is a compression spring, and each of the first protruding portion 663a of the first push bar 662a and the second protruding portion 663b of the second push bar 662b is a plate capable of being forced averagely by the first elastic element 650a and the second elastic element 650b respectively.

Figure 9:
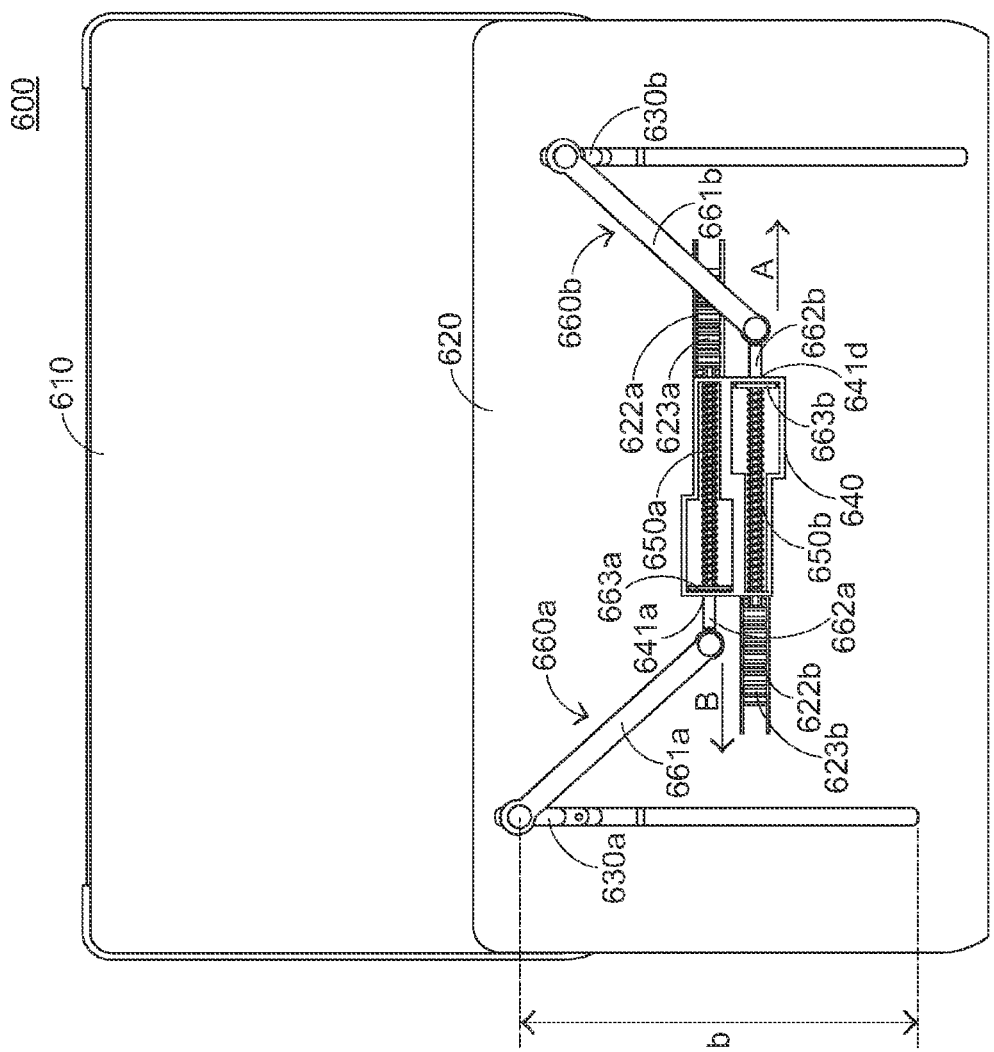
FIG. 9 illustrates a schematic view of the sliding mechanism operated with a second movement according to the second embodiment of the present invention.

FIG. 9 illustrates a schematic view of the sliding mechanism operated with a second movement according to the second embodiment of the present invention. Referring to FIG. 9, when the second board 620 slides a second distance b relative to the first board 610 as illustrated in FIG. 9, the frame 640 moves together with the second board 620, and thus a distance between the frame 640 and the first fixed piece 630a and a distance between the frame 640 and the second fixed piece 630b are increased. Hence, the first linkage 661a of the first sliding element 660a passes through out of the opening 641a of the first opening set of the frame 640 to drive the first push bar 662a to move along the second direction B, and the second linkage 661b of the second sliding element 660b passes through out of the opening 641d of the second opening set of the frame 640 to drive the second push bar 662b to move along the first direction A. Therefore, the first elastic element 650a passed through by the first push bar 662a and the second elastic element 650b passed through by the second push bar 662b are not pressed respectively by the first protruding portion 663a of the first push bar 662a and the second protruding portion 663b of the second push bar 662b anymore, so as to make the second board 620 slide automatically relative to the first board 610 due to the first elastic element 650a and the second elastic element 650b release the elastic forces.

In the present preferred embodiment, the first distance a is smaller than the second distance b. In addition, as illustrated in FIG. 7, FIG. 8 and FIG. 9, the second board 620 further comprises a first groove 622a and a second groove 622b. The first groove 622a is disposed on a moving route of the first push bar 662a, and the first groove 622a has a plurality of teeth 623a therein, while the second groove 622b is disposed on a moving route of the second push bar 662b, and the second groove 622b has a plurality of teeth 623b therein. When the second board 620 slides relative to the first board 610, the first push bar 662a moves along the first direction A or the second direction B and generates a friction with the plurality of teeth 623a in the first groove 622a, and the second push bar 662b moves along the first direction A or the second direction B and generates a friction with the plurality of teeth 623b in the second groove 622b, so as to provide a plurality of steps during the second board 620 slides. Accordingly, it is able to enrich hand feelings during users operate the sliding mechanism 600.

According to the above mentioned preferred embodiments, it can be understood that the sliding mechanism of the present invention limits the first sliding element by the frame disposed over the second board and the first fixed piece disposed on the first board, so as to hold the second board between the first board and the first sliding element. In addition, when the second board slides relative to the first board, the distance between the first fixed piece and the frame is changed, and thus the first elastic element is deformed due to the first sliding element moves, so as to generate and release elastic forces. Therefore, the second board may slide automatically relative to the first board without disposing guiding rail structures or adding liners in the guiding slots. Such a structure is not only suitable for longer sliding distance, but also has advantages of having simple structures and easily assembling, so as to enhance the production efficiency of the sliding mechanism.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A sliding mechanism, comprising:
a first board;
a second board, disposed over the first board and has a first slot;
a first fixed piece, disposed on the first board, wherein the first fixing piece passes through the first slot of the second board;
a frame, disposed over the second board;
a first elastic element, disposed in the frame; and
a first sliding element, disposed over the second board, wherein one end of the first sliding element is fixed to the first fixed piece, when the second board slides a first distance relative to the first board, the first sliding element slides along a first direction to press the first elastic element, so as to make the first elastic element generate a first elastic force, while when the second board slides a second distance relative to the first board, the first sliding element slides along a second direction to make the first elastic element release the first elastic force, so as to make the second board slide automatically relative to the first board.

2. The sliding mechanism as claimed in claim 1, wherein the first slot is a linear slot.

3. The sliding mechanism as claimed in claim 1, wherein the first elastic element is a compression spring.

4. The sliding mechanism as claimed in claim 1, wherein the first sliding element comprises a first push bar and a first linkage, the first push bar is disposed in the frame, an end of the first linkage is fixed to the first fixed piece, and the other end of the first linkage is pivoted to the first push bar.

5. The sliding mechanism as claimed in claim 4, wherein the first push bar comprises a protruding portion capable of making the first elastic element generate deformation.

6. The sliding mechanism as claimed in claim 5, wherein the protruding portion is a plate.

7. The sliding mechanism as claimed in claim 4, wherein the first push bar passes through the first elastic element.

8. The sliding mechanism as claimed in claim 4, wherein the frame comprises two openings, and the first push bar passes through the two openings.

9. The sliding mechanism as claimed in claim 4, wherein the sliding mechanism further comprises a first connecting element, the first fixed piece has a first fixing aperture, the first linkage has a second fixing aperture, and the first connecting element passes through the first fixing aperture and the second fixing aperture, so as to connect the first fixed piece and the first linkage.

10. The sliding mechanism as claimed in claim 4, wherein the sliding mechanism further comprises a first pivoting element, the first linkage has a first pivoting aperture, the first push bar has a second pivoting aperture, and the first pivoting element passes through the first pivoting aperture and the second pivoting aperture, so as to connect the first linkage and the first push bar.

11. The sliding mechanism as claimed in claim 1, wherein the first distance is smaller than the second distance.

12. The sliding mechanism as claimed in claim 1, wherein the second board further comprises a groove disposed on a moving route of the first push bar, and the groove has a plurality of teeth therein, so as to provide a plurality of steps during the second board slides.

13. The sliding mechanism as claimed in claim 1, wherein the sliding mechanism further comprises:
  a second slot, disposed to the second board;
  a second fixed piece, disposed on the first board, wherein the second fixed piece passes through the second slot of the second board;
  a second elastic element, disposed in the frame; and
  a second sliding element, disposed over the second board, wherein an end of the second sliding element is fixed to the second fixed piece, when the second board slides the first distance relative to the first board, the second sliding element slides along the second direction to press the second elastic element, so as to make the second elastic element generate a second elastic force, while when the second board slides the second distance relative to the first board, the second sliding element slides along the first direction to make the second elastic element release the second elastic force, so as to make the second board slide automatically relative to the first board.

14. The sliding mechanism as claimed in claim 13, wherein the first slot and the second slot are linear slots.

15. The sliding mechanism as claimed in claim 13, wherein the first elastic element and the second elastic element are compression springs.

16. The sliding mechanism as claimed in claim 13, wherein the first sliding element comprises a first push bar and a first linkage, the second sliding element comprises a second push bar and a second linkage, the frame comprises a first containing space and a second containing space, the first push bar is disposed in the first containing space, an end of the first linkage is fixed to the first fixed piece, the other end of the first linkage is pivoted to the first push bar, the second push bar is disposed in the second containing space, an end of the second linkage is fixed to the second fixed piece, and the other end of the second linkage is pivoted to the second push bar.

17. The sliding mechanism as claimed in claim 16, wherein the first push bar comprises a first protruding portion capable of making the first elastic element generate deformation, and the second push bar comprises a second protruding portion capable of making the second elastic element generate deformation.

18. The sliding mechanism as claimed in claim 17, wherein the first protruding portion and the second protruding portion are plates.

19. The sliding mechanism as claimed in claim 16, wherein the first push bar passes through the first elastic element, and the second push bar passes through the second elastic element.

20. The sliding mechanism as claimed in claim 16, wherein the frame comprises a first opening set and a second opening set, the first push bar passes through the first opening set, and the second push bar passes through the second opening set.

21. The sliding mechanism as claimed in claim 20, wherein each of the first opening set and the second opening set comprises two openings.

22. The sliding mechanism as claimed in claim 16, wherein the sliding mechanism further comprises a first connecting element and a second connecting element, the first fixed piece has a first fixing aperture, the first linkage has a second fixing aperture, the second fixed piece has a third fixing aperture, the second linkage has a fourth fixing aperture, the first connecting element passes through the first fixing aperture and the second fixing aperture, so as to connect the first fixed piece and the first linkage, and the second connecting element passes through the third fixing aperture and the fourth fixing aperture, so as to connect the second fixed piece and the second linkage.

23. The sliding mechanism as claimed in claim 16, wherein the sliding mechanism further comprises a first pivoting element and a second pivoting element, the first linkage has a first pivoting aperture, the first push bar has a second pivoting aperture, the second linkage has a third pivoting aperture, the second push bar has a fourth pivoting aperture, the first pivoting element passes through the first pivoting aperture and the second pivoting aperture, so as to connect the first linkage and the first push bar, and the second pivoting element passes through the third pivoting aperture and the fourth pivoting aperture, so as to connect the second linkage and the second push bar.

24. The sliding mechanism as claimed in claim 13, wherein the first distance is smaller than the second distance.

25. The sliding mechanism as claimed in claim 13, wherein the second board further comprises a first groove and a second groove, the first groove is disposed on a moving route of the first push bar, the second groove is disposed on a moving route of the second push bar, and each of the first groove and the second groove has a plurality of teeth therein, so as to provide a plurality of steps during the second board slides.

* * * * *